United States Patent
Wu et al.

(10) Patent No.: US 11,574,459 B2
(45) Date of Patent: Feb. 7, 2023

(54) DISTANCE-TO-BED-BOUNDARY INVERSION SOLUTION PIXELATION

(71) Applicant: Halliburton Energy Services, Inc., Houston, TX (US)

(72) Inventors: Hsu-Hsiang Wu, Sugar Land, TX (US); Rencheng Song, Singapore (SG); Li Pan, Singapore (SG)

(73) Assignee: Halliburton Energy Services, Inc., Houston, TX (US)

( * ) Notice: Subject to any disclaimer, the term of this patent is extended or adjusted under 35 U.S.C. 154(b) by 671 days.

(21) Appl. No.: 16/461,923

(22) PCT Filed: Feb. 6, 2017

(86) PCT No.: PCT/US2017/016698
§ 371 (c)(1),
(2) Date: May 17, 2019

(87) PCT Pub. No.: WO2018/144035
PCT Pub. Date: Aug. 9, 2018

(65) Prior Publication Data
US 2019/0346584 A1    Nov. 14, 2019

(51) Int. Cl.
*G06V 10/75*    (2022.01)
*E21B 47/026*    (2006.01)
(Continued)

(52) U.S. Cl.
CPC .......... *G06V 10/751* (2022.01); *E21B 47/026* (2013.01); *G01V 3/34* (2013.01); *G01V 3/38* (2013.01); *G01V 3/20* (2013.01)

(58) Field of Classification Search
None
See application file for complete search history.

(56) References Cited

U.S. PATENT DOCUMENTS 5,210,691 A  *  5/1993  Freedman ................. G01V 3/28
                                                    324/339
5,999,489 A     12/1999  Lazaratos
(Continued)

FOREIGN PATENT DOCUMENTS

WO    WO 2013/022909 A9    2/2013
WO    WO 2014/123509 A1    8/2014
(Continued)

OTHER PUBLICATIONS

International Search Report and The Written Opinion of the International Search Authority, dated Nov. 8, 2017, PCT/US2017/016698, 11 pages, ISA/KR.
Chemali et al., "Successful Application of Azimuthal Propagation Resistivity for Optimum Well Placement and Reservoir Characterization While Drilling," *SPE Annual Technical Conference and Exhibition*, Nov. 14, 2007, pp. 1-12, XP55689346.
(Continued)

*Primary Examiner* — Lina M Cordero
(74) *Attorney, Agent, or Firm* — DeLizio, Peacock, Lewin & Guerra (57) ABSTRACT

A pixelation-based approach to summarize downhole inversion results acquires inversion solutions and generates an initial model. Each layered solution is pixelated into pixels where each pixel contains the resistivity value of the initial model. A weighted function that weighs pixels according to their proximity to the logging tool may be used to generate the pixelated model to thereby improve accuracy. A statistical summary study is performed to identify the best pixelated model, which is then used to determine one or more formation characteristics.

19 Claims, 7 Drawing Sheets

(51) Int. Cl.
   *G01V 3/34*    (2006.01)
   *G01V 3/38*    (2006.01)
   *G01V 3/20*    (2006.01)

(56) References Cited

U.S. PATENT DOCUMENTS

| | | |
|---|---|---|
| 6,388,947 B1 | 5/2002 | Washbourne et al. |
| 6,594,584 B1 * | 7/2003 | Omeragic ............... G01V 3/28 |
| | | 702/9 |
| 2008/0270028 A1 * | 10/2008 | Abubakar ............... G01V 3/12 |
| | | 702/2 |
| 2014/0350859 A1 | 11/2014 | Lin et al. |
| 2017/0075021 A1 * | 3/2017 | Thiel ...................... E21B 47/13 |
| 2018/0321415 A1 * | 11/2018 | Thiel ...................... E21B 7/04 |

FOREIGN PATENT DOCUMENTS

| | | |
|---|---|---|
| WO | WO 2015/005937 A1 | 1/2015 |
| WO | WO 2015/113067 A1 | 7/2015 |
| WO | WO 2015/134455 A1 | 9/2015 |
| WO | WO 2016/111685 A1 | 7/2016 |

OTHER PUBLICATIONS

Extended Search Report issued for European Patent Application No. 17895293.3, dated May 15, 2010, 13 pages.

Wang et al., "Dipping Bed Response and Inversion for Distance to Bed for a New While-Drilling Resistivity Measurement," *SEG Technical Program Expanded Abstracts*, Jan. 2006, pp. 416-420, XP055689417.

* cited by examiner

DISTANCE-TO-BED-BOUNDARY INVERSION SOLUTION PIXELATION

PRIORITY

The present application is a U.S. National Stage patent application of International Patent Application No. PCT/US2017/06698, filed on Feb. 6, 2017, the benefit of which is claimed and the disclosure of which is incorporated herein by reference in its entirety.

FIELD OF THE DISCLOSURE

The present disclosure relates generally to the interpretation of resistivity data obtained downhole and, more specifically, to the use of pixelation to more accurately interpret distance-to-bed-boundary ("DTBB") inversion solutions.

BACKGROUND

The use of resistivity data is well known in the oil and gas industry. However, resistivity is a difficult formation property to measure accurately, as no technique currently exists for directly measuring formation resistivity in-situ. Instead, resistivity is typically estimated by measuring the amount of electrical current in the formation, usually through logging-while-drilling ("LWD") operations and the like. An inversion process is used that increases the resolution and reliability of the LWD data and thereby improves the accuracy of the resistivity estimations.

Inversion generally entails first building a parametric model of the formation based on a selected set of parameters, then using a computer to predict a log response based on the model. The predicted log response is then compared with measured log data acquired from logging or other operation. The difference between the predicted log and the measured log is thereafter compared and, based on the comparison, the selected model parameters are revised and/or new model parameters are selected. The process is then repeated until the difference between the modeled log and the measured log is minimized within existing computational constraints.

For years, this layered model-based inversion has been used in the electromagnetic resistivity logging tools to identify major boundaries between different formation resistivities. A one-dimensional ("1D") formation assumption is typically used in the inversion as well, where each layered boundary is parallel from one to another. Those formation assumptions are fairly true owing to the detection range of the measurements used in the inversion. Generally speaking, the typical detection range of conventional resistivity logging tools is around 5~10 ft, and the maximum detection is around 18 ft.

Recently, ultra-deep resistivity logging tools have been developed to detect formation boundaries 100 ft sideway away from the tools, having much deeper detection range than the older logging tools. When used with the ultra-deep resistivity tools, the simplified formation assumptions used with the older tools can result in problematic solutions in the DTBB inversion for such deep measurements. Because of the large volume of the ultra-deep measurements these tools can provide, such measurements may not provide as sharp a boundary when compared to those of the older, more shallow, resistivity tools. The lack of clearly defined boundaries in gradient resistivity profiles results in unstable inversion results (i.e., solution ambiguity) which can lead to operational failures.

DESCRIPTION OF ILLUSTRATIVE EMBODIMENTS

Illustrative embodiments and related methods of the present disclosure are described below as they might be employed in DTBB solution pixelation. In the interest of clarity, not all features of an actual implementation or methodology are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, illustrative embodiments and methods of the present disclosure describe a pixelation-based approach to summarize inversion results. In a generalized method, all inversion solutions at one depth (or could be at various depths that are closer to each other) are acquired and an initial model is generated. Then, each layered solution is pixelated into pixels where each pixel contains the resistivity value or color based on the initial model, thus generating a pixelated model. A weighted function that weighs pixels according to their proximity to the logging tool may be used to generate the pixelated model, thus integrating measurement sensitivity into the boundary positions. In the end, a statistical summary study is performed based on the pixelation solutions to identify the best pixelated model used to determine one or more formation characteristics. Accordingly, the present disclosure addresses gradient formation resistivity profiles as well as provides better understanding and interpretation of the formation geology for customers.

Such solution pixelation methods are also useful in stochastic inversion where many inversion solutions may be acquired.

The illustrative methods and embodiments described herein have compatibility and applicability to a wide range of tools and services, including any type or design of downhole resistivity LWD tools and services. Examples may include resistivity LWD services for formation evaluation and geo-steering, as well as look-ahead-look-around ("LALA") and very deep resistivity ("VDR") tools. In general, any resistivity LWD tool, wireline-based logging tool, or service requiring inversion for resistivity LWD data analysis and interpretation, whether for formation evaluation, LALA, or geo-steering, and particularly DTBB inversion for geo-steering and formation evaluation, may benefit from the present disclosure.

Figure 1A:
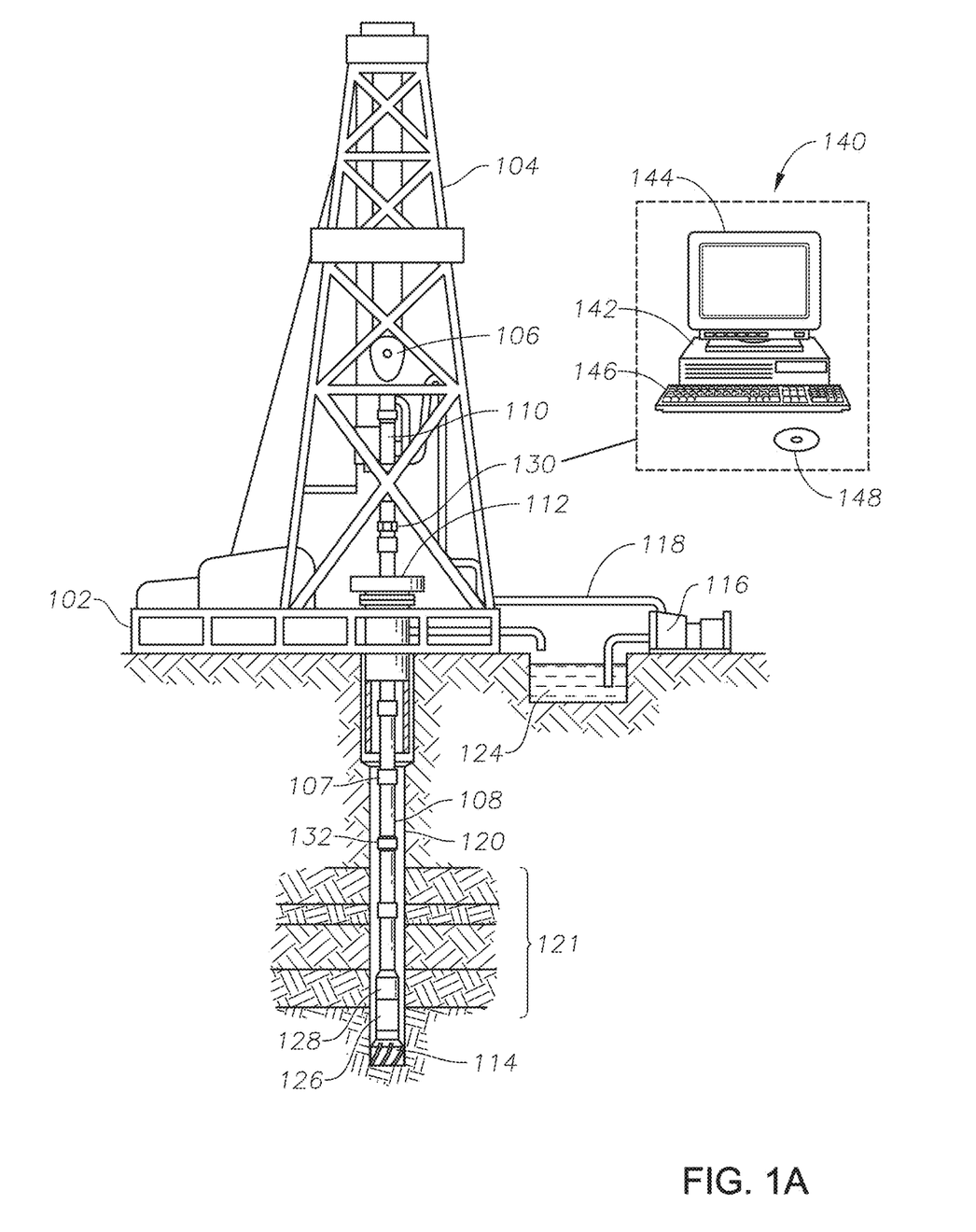
FIG. 1A illustrates a logging tool utilized in an LWD application, according to certain illustrative embodiments as described herein.

A LWD environment is shown in FIG. 1A, according to certain illustrative embodiments of the present disclosure. A drilling platform 102 is equipped with a derrick 104 that supports a hoist 106 for raising and lowering a drill string 108. The hoist 106 suspends a top drive 110 that is used to rotate the drill string 108 and to lower the drill string through the well head 112. Sections of drill string 108 are connected by threaded connectors 107. Connected to the lower end of drill string 108 is a drill bit 114. Rotation of bit 114 creates a borehole 120 that passes through various formations 121. A pump 116 circulates drilling fluid through a supply pipe 118 to top drive 110, downhole through the interior of drill string 108, through orifices in drill bit 114, back to the surface via the annulus around drill string 108, and into retention pit 124. The drilling fluid transports cuttings from the borehole 120 into pit 124 and aids in maintaining the integrity of the borehole.

A logging tool 126 is integrated into the bottom-hole assembly near the bit 114. The logging tool 126 may take the form of a drill collar, e.g., a thick-walled tubular that provides weight and rigidity to aid the drilling process. In at least one embodiment, logging tool 126 is an electromagnetic resistivity LWD tool. For example, the logging tool 126 may be an Azimuthal Deep Resistivity® ("ADR") service offered by Halliburton Energy Services, Inc., operating in a rotating (drilling) mode. As the bit 114 extends the borehole 120 through formations 121, the logging tool 126 collects measurements relating to various formation properties as well as the tool orientation and position and various other drilling conditions.

In wells employing mud pulse telemetry for LWD, downhole sensors (including resistivity logging tool 126) are coupled to a telemetry module 128 including a mud pulse telemetry transmitter that transmits telemetry signals in the form of pressure variations in the tubing wall of drill string 108. A mud pulse telemetry receiver array 130 (including, e.g., one or more pressure transducers) may be coupled to tubing below the top drive 110 to receive transmitted telemetry signals. Other telemetry techniques can be employed including acoustic telemetry (using, e.g., one or more repeater modules 132, to receive and retransmit telemetry signals), electromagnetic telemetry, and wired drill pipe telemetry. Many telemetry techniques also offer the ability to transfer commands from the surface to the tool, thereby enabling adjustment of the tool's configuration and operating parameters. In at least some embodiments, telemetry module 128 additionally, or alternatively, stores measurements for later retrieval when the tool returns to the surface.

A computer system (or processing system/circuitry) 140 collects measurements from the logging tool 126 (e.g., via the receiver array 130), and includes computing facilities for processing and storing the measurements gathered by the logging tool. Although illustrated as being on the surface, computer system 140 may also be located downhole, in which case processing occurs downhole as well. In at least some embodiments, computer system 140 includes a processor 142 that performs formation modeling analysis operations by executing software or instructions obtained from a local or remote non-transitory computer-readable medium 148.

The processor 142 may be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In at least some embodiments, computer hardware can further include elements such as, for example, a memory (e.g., random access memory ("RAM"), flash memory, read only memory ("ROM"), programmable read only memory ("PROM"), erasable read only memory ("EPROM")), registers, hard disks, removable disks, CD-ROMS, DVDs, or any other like suitable storage device or medium. The computer system 140 also may include input device(s) 146 (e.g., a keyboard, mouse, touchpad, etc.) and output device(s) 144 (e.g., a monitor, printer, etc.). Such input device(s) 146 and/or output device(s) 144 provide a user interface that enables an operator to interact with the logging tool 126 and/or software executed by the processor 142. For example, computer system 140 may enable an operator to select resistivity analysis options, to view collected resistivity data, to view resistivity analysis results, and/or to perform other tasks.

Figure 1B:
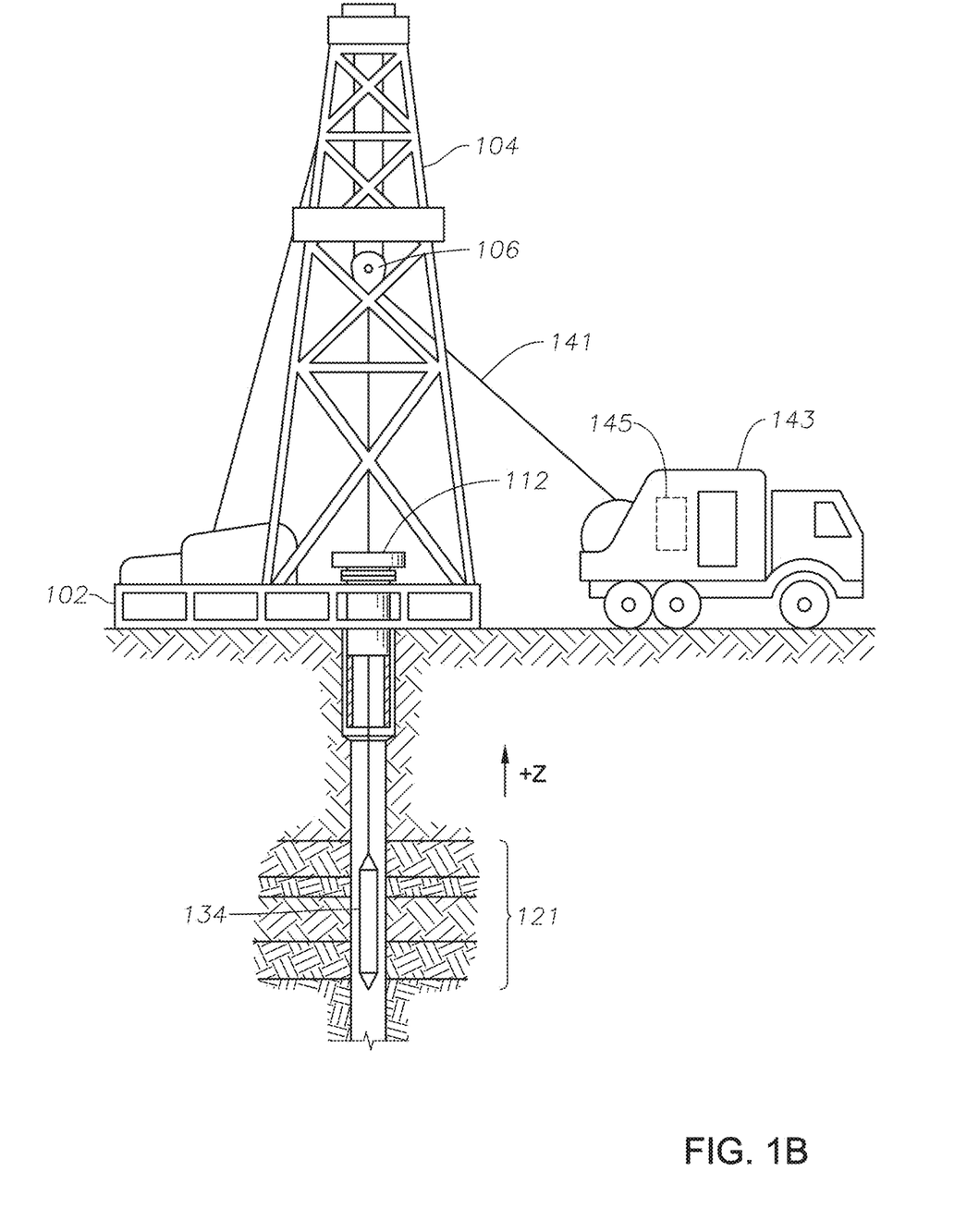
FIG. 1B illustrates a logging tool utilized in a wireline application according to certain illustrative embodiments as described herein.

FIG. 1B illustrates an alternative embodiment of the present disclosure whereby a wireline logging tool acquires resistivity measurements. At various times during the drilling process, drill string 108 may be removed from the borehole as shown in FIG. 1B. Once drill string 108 has been removed, logging operations can be conducted using a wireline logging sonde 134, i.e., an acoustic probe suspended by a cable 141 having conductors for transporting power to the sonde and telemetry from the sonde to the surface. A wireline logging sonde 134 may have pads and/or centralizing springs to maintain the tool near the axis of the borehole as the tool is pulled uphole. Logging sonde 134 can include a variety of transmitters/receivers for measuring formation resistivity, etc. A logging facility 143 collects resistivity measurements from logging sonde 134, and includes a computer system 145 for processing and storing the resistivity measurements gathered by the sensors, as described herein.

Using the system of FIGS. 1A and 1B (or a variety of other logging systems, e.g., wireline systems), resistivity measurements are obtained and inversion is performed. In one illustrative method, the inversion is DTBB inversion for analysis and interpretation. In this approach, a position of a well logging instrument (e.g., logging tool 126) with respect to a bed boundary (e.g., a formation layer discontinuity) is determined by inversion processing. To perform the inversion in general, an initial formation model (or layered earth model) is generated. The initial formation model carries an initial estimate of the geometry and/or characteristics of the earth formations (e.g., formation 121 of FIGS. 1A and 1B) surrounding a wellbore in which the well logging instrument is positioned. For example, the initial formation model may be characterized by particular layer boundaries and/or particular isotropic or anisotropic values (e.g., resistivity values). Electromagnetic ("EM") attributes of the initial formation model may include resistivity, conductivity, permittivity, permeability, chargeability, and/or other induced polarization ("IP") parameters/characteristics. The EM attributes may be isotropic or anisotropic. A layer dip may be recovered from the orientation of the well logging instrument with respect to the 1D resistivity model.

The initial formation model may represent the earth formations surrounding the wellbore as a series of layers or strata, demarcated by boundaries between contiguous layers. In the layered earth model, physical properties of the individual layers in the model may include, e.g., resistivity (or conductivity) of each layer, a thickness of each layer, and a selected number of layers above and/or below a layer of interest. In at least some situations, the layer of interest is the layer in which the well logging instrument is positioned in the wellbore.

To refine the layered earth model as described herein, each layer in the inversion solution is pixelated into pixels that contain the same resistivity value as its corresponding layer. Thereafter, the resultant pixelated models are analyzed using the methods described herein to determine the optimal pixelated model that will be used to determine the formation characteristics, which may then be used to perform a variety of wellbore operations. These and other advantages of the present disclosure will be readily apparent to those ordinarily skilled in the art having the benefit of this disclosure.

Figure 2:
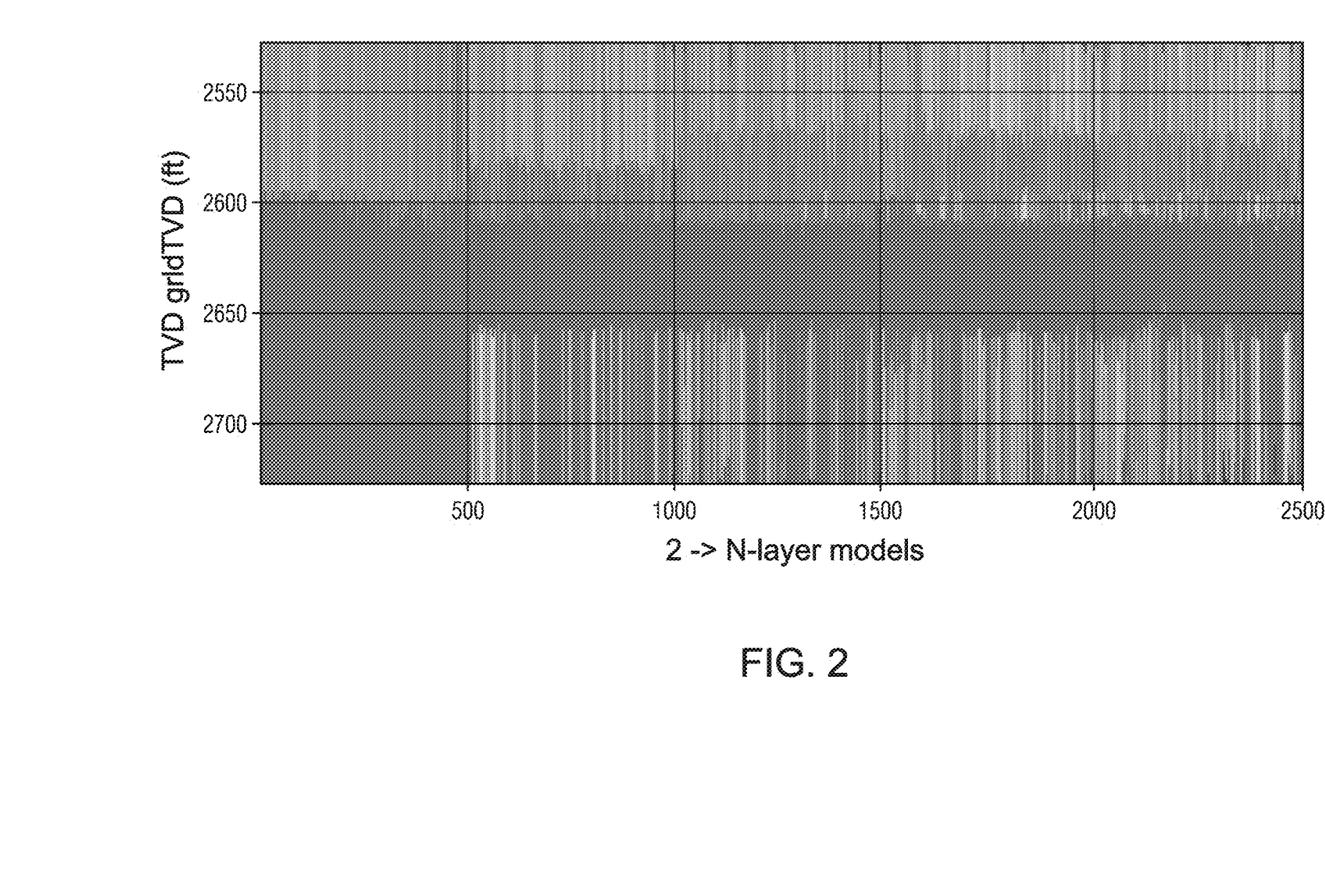
FIG. 2 illustrates all the inversion solutions for an N-layered model at a particular depth downhole acquired using ultra-deep reading tool measurements, according to certain illustrative methods described herein.

Often, many inversion solutions are acquired from the deterministic inversion or stochastic inversion approaches. FIG. 2 illustrates all the inversion solutions for an N-layered model at a particular depth downhole acquired using ultra-deep reading tool measurements, according to certain illustrative methods described herein. Different gray-scaled coloring in the figure shows different resistivity values for the formation along the true vertical depth ("TVD") in the y-axis, whereas the x-axis shows the index of each solution acquired from the inversion approaches. As observed in FIG. 2, one can clearly see some of the solutions converge to the same boundary positions; however, the boundary position varies from one solution to another because the inverted resistivity of each solution also varies. This indeed indicates the solution ambiguity issues that arise due to the limited number of layers used in the inversion and/or gradient formation profiles in the real formations.

Figure 3:
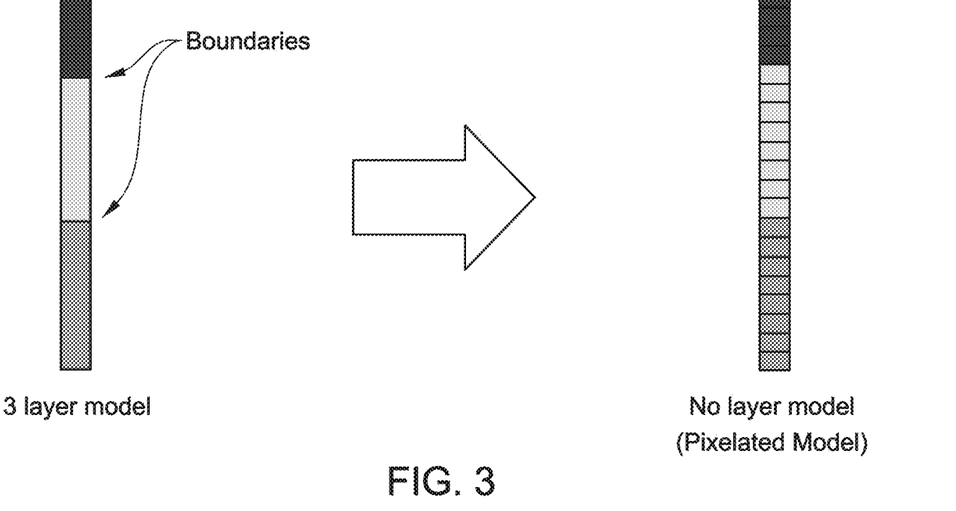
FIG. 3 illustrates one example of pixelation of a DTBB inversion solution.

To determine the best interpretation of the inverted formation model from the many solutions using simplified formation assumptions, illustrative methods and embodiments of the present disclosure apply a pixelation method to each of the inverted solutions. FIG. 3 illustrates one example of pixelation of a DTBB inversion solution. Here, the resistivity measurements acquired downhole have been used to generate a single 3 layer model (i.e., inversion solution). However, in other examples, more or less layers may be utilized. The illustrative 3 layer model has two boundaries as indicated, where each layer represents a resistivity value of the formation. According to the methods described herein, the 3-layer model solution from the inversion is divided into many pixels where each pixel contains the resistivity data (which may be indicated by various indicators, e.g., color, gray scale, etc.) of the corresponding original 3-layer model, thus creating a pixelated model. As can be seen in FIG. 3, the thickness of the layers in both models is the same. However, since the values of each pixel are known, the boundaries are no longer necessary. As a result, the layer model assumption is indeed removed in the pixelation solution model.

The pixelation may be performed in a variety of ways. In certain illustrative methods, for example, for a layer with known total thickness d, the constant pixel width is defined as z. The whole layer will be represented by pixels from z, $2*z, 3*z, \ldots, d$. Each pixel has the same resistivity value as the original corresponding layer. For each layer, the above pixelation is applied and the formation with all layers is represented as pixelation model. The number of pixels used for a given pixelation model may be varied depending upon the desired resolution.

Figure 4:
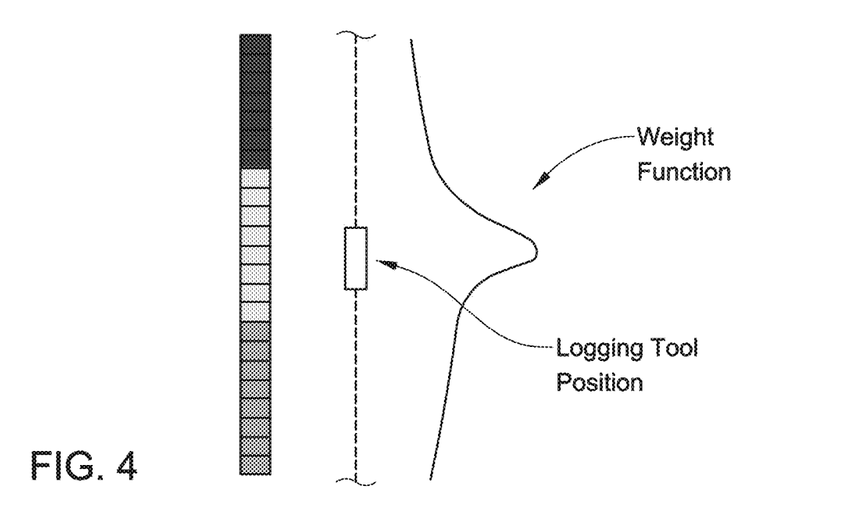
FIG. 4 illustrates the application of the weighted function in certain illustrative methods of the present disclosure.

As the plurality of layered models are generated from the resistivity measurements, a plurality of corresponding pixelated models are also generated. Thereafter, a statistical study may be performed on the many inversion solutions. In certain illustrative methods, the statistical methods involve comparing the pixelated models to a reference model or to one another in order to determine the most optimal pixelation model, as will be described in further detail below. A weighted function can also be applied to the pixelated model when generating the pixelated model or when performing the statistical study on the many inversion solutions. FIG. 4 illustrates the application of the weighted function in certain illustrative methods of the present disclosure. Here, a pixelated model is shown next to an illustrative weight function. In addition, the position of the logging tool (when the resistivity measurements were acquired) is also illustrated. As can be seen, the weighted function is applied to weigh the pixels according to their proximity to the logging tool position. Those pixels which are closer to the logging tool are weighed more heavily than those further away.

The weighted function applied may take a variety of forms. For example, in certain methods the weight can be defined as a Gaussian function where the pixels close to the tool have a larger weight compared to the pixels far away from the tool. The whole weight may resemble a bell shape to highlight the pixels close to the tool, which is consistent to the tool sensitivity. The weighted function provides the uncertainty considerations when the pixel solution is far away from the tool position, where the tool measurements will have less sensitivity to those far boundaries/resistivities and the corresponding inversion results may be inaccurate.

Figure 5:
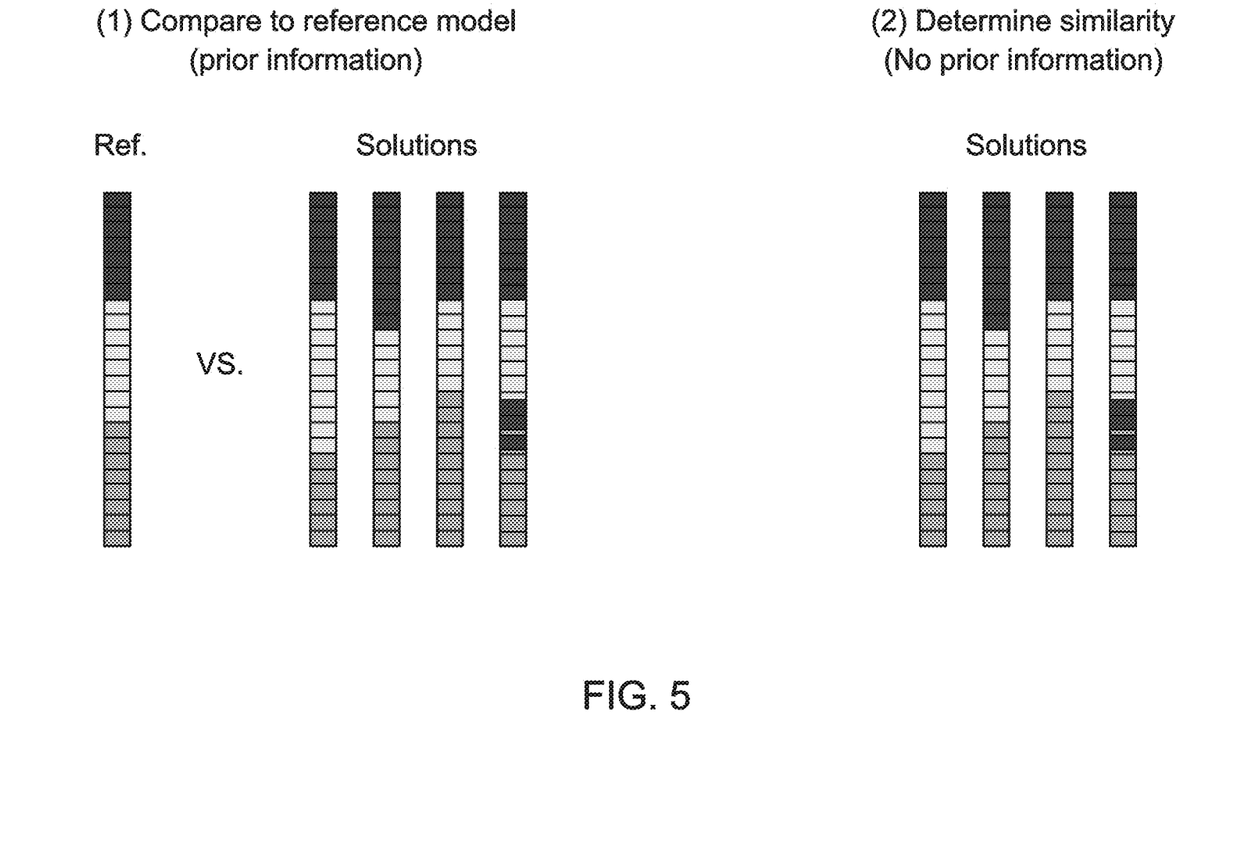
FIG. 5 illustrates two approaches to perform the statistical study on the many solutions, according to alternative illustrative methods of the present disclosure.

In view of the foregoing, FIG. 5 illustrates two illustrative approaches (5(1) and 5(2)) to perform the statistical study on the many solutions. In a first method (5(1)), the pixelated models are compared pixel-by-pixel to a reference model at the same depth(s). The reference model may be generated in a number of ways, such as, for example, being defined by a user based on the offset well logs, other reference tools, etc. By comparison with the pixelated models, the reference model will indicate the best similar models from the many solutions using the pixelation method. In FIG. 5, the reference model was obtained from an offset well. In order to perform the study, each pixel of the pixelated models is compared to its corresponding pixel in the reference model. The corresponding pixels may be identified in a variety of ways such as, for example, by depth. There may be two depths to represent the position of pixel: the measured depth (MD) and the true vertical depth (TVD). Each pixel has a coordinate represented as (MD_j,TVD_i). The reference model is pixelated as a pixel model. The inversion solution model is also pixelated as pixels. Then, the pixels from the reference model and solution models with the same coordinates are compared to determine the pixel of final solution.

Figure 7A:
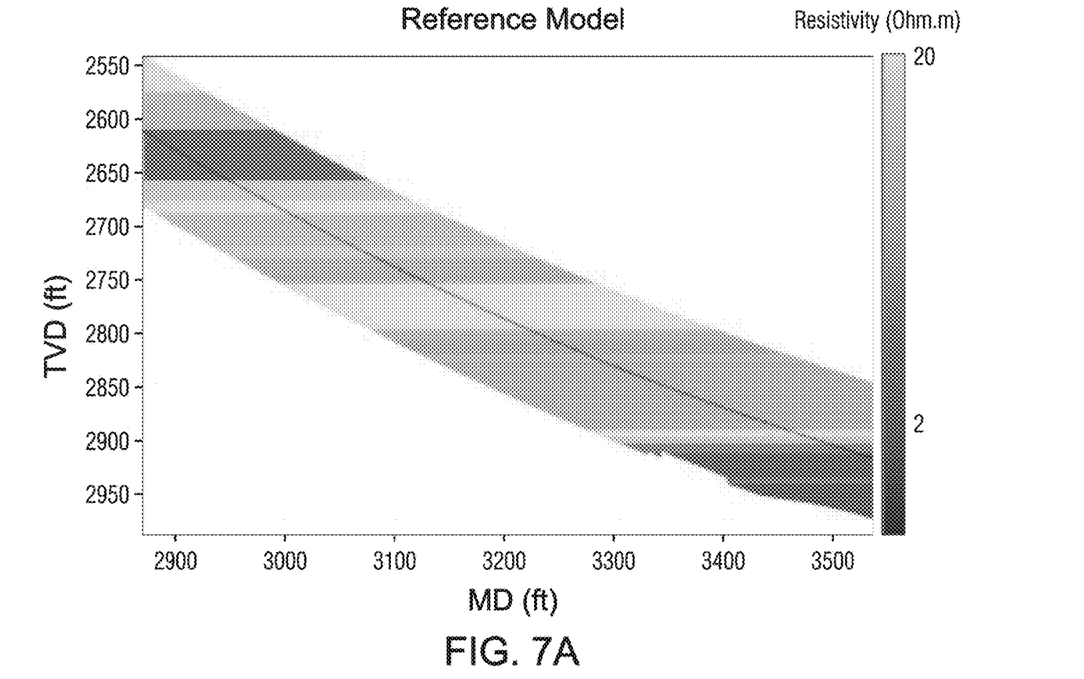
FIGS. 7A and 7B illustrate a reference model and pixelated model, respectively, according to certain illustrative methods of the present disclosure.
Figure 7B:
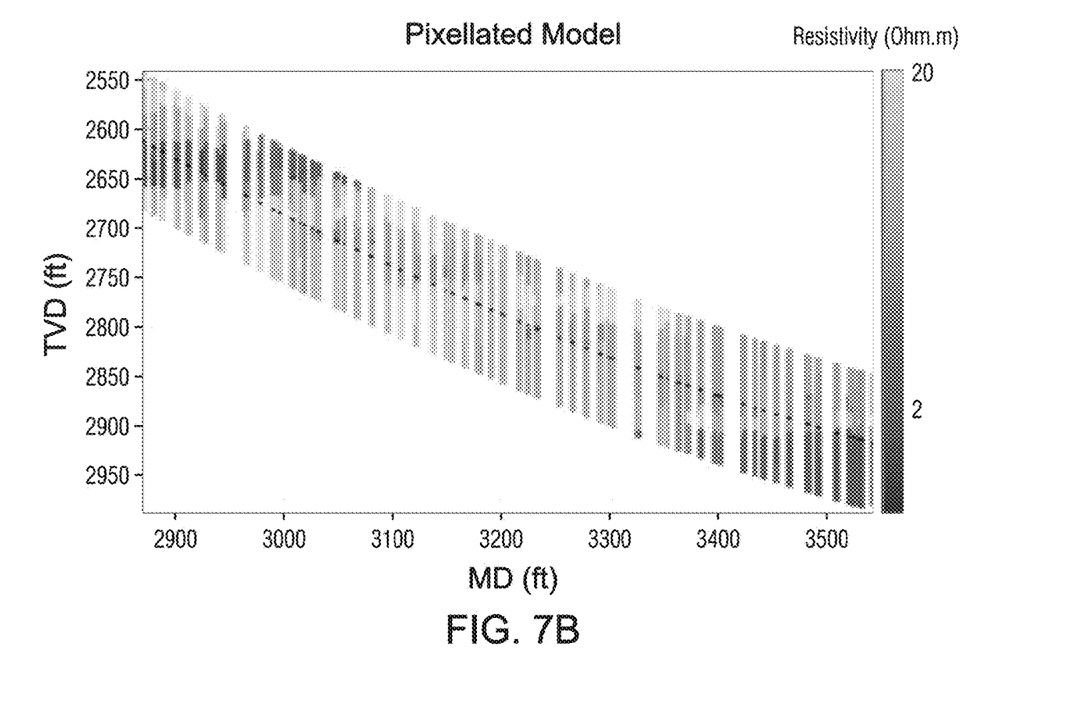

Once identified, the similarity of all pixelated models may be compared to one another to thereby determine the closets match to the reference model. FIGS. 7A and 7B illustrate a reference model and pixelated model, respectively. To compare the pixels, each pixel may be considered as a vector and the vectors are compared. As described above, at the given MD, the formation model is pixelated as pixels. All those pixels are represented as a vector with the same MD. Therefore, the comparison of pixel can be an individual pixel (at (MD_j,TVD_i)) comparison or the pixel vector (each pixel is at (MD_j,TVD_i),i=1, 2, . . . , Npixel) comparison.

However, note the prior information (e.g., offset wells, etc.) may not be accurate always. Thus, and still referring to FIG. 5, a second illustrative method (5(2)) is illustrated whereby all pixelated models at the same depth(s) are compared to one another pixel-by-pixel. This method compares the similarity among many solutions by themselves (i.e., without a reference model) using the pixelation method. In certain methods, a median may be taken of all corresponding pixels in order to determine a final pixelated model. However, a variety of other statistical methods may be used as well.

In either statistical approach, with the weighted function applied to the pixelation, the system focuses on the pixel solutions closer to the tool positions rather than the pixel solutions that are far away from the tool. On the other hand, in other illustrative methods it is not necessary to have the weighted function if the tool measurements have enough sensitivity to detect the maximum range of the inversion.

Figure 6:
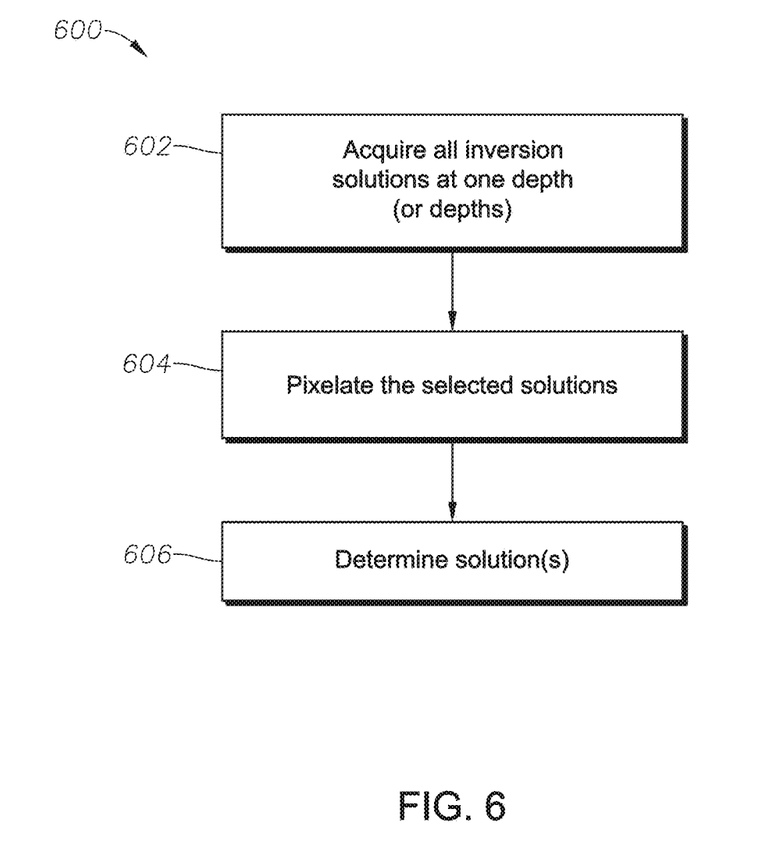
FIG. 6 is a flow chart of a method for modeling a subterranean formation, according to an illustrative method of the present disclosure.

FIG. 6 is a flow chart of a method for modeling a subterranean formation, according to an illustrative method of the present disclosure. At block 602 of method 600, many inversion solutions at one depth (or could be at various depths that are closer to each other) are acquired by a logging tool positioned along a subterranean formation. At block 604, each solution is pixelated into pixels and each pixel contains the resistivity value (e.g., color, gray scale, etc.) based on the original layered model. In certain illustrative methods, a weighted function can be applied into the pixel solutions to consider the measurement sensitivity to the boundary positions. At block 606, a statistical summary study is performed based on the pixelation solutions to identify the best model. Here, in certain illustrative methods, the weighting function may also be applied to heavily weigh those pixels closest to the tool position. Once the optimal pixelated model is determined, one or more formation characteristics (e.g., permeability, etc.) may be determined using the model. In turn, a wellbore operation can be conducted such as, for example, Geosteering.

The illustrative modeling and inversion methods described in this disclosure can be implemented as either a stand-alone software or integrated as part of a commercial survey/navigation/collision avoidance software or digital asset modeling software (e.g., StrataSteer3D® or Decision-Space® from Halliburton Energy Services, Inc.) through an application programmable interface ("API"). In those embodiments integrated in drilling applications, the inversion methods may be performed in real-time as the bottom hole assembly is drilling. Moreover, the disclosed processing may be performed remotely from the well site, whereby computers at the well site are connected to the remote processing computers via a network. Users may then use the methods to better analyze the resistivity data inversion and related models, and thereby obtain a more accurate estimation of formation resistivity.

The illustrative embodiments and methods described herein provide efficient methods to analyze DTBB results with different layers. After pixelation, all the solutions are represented as pixels where the color or other indicator represents the resistivity value. As a result, the final inversion solution and its accuracy can be obtained with a univariate statistical analysis instead of considering resistivity and boundary separately as in conventional approaches.

Methods and embodiments described herein further relate to any one or more of the following paragraphs:

1. A method for modeling a subterranean formation, comprising acquiring logging data representing formation resistivity along a wellbore; performing a distance-to-bed-boundary ("DTBB") inversion process on the logging data to thereby generate a layered earth model; pixelating the layered earth model to thereby generate a pixelated model; and determining one or more formation characteristics using the pixelated model.

2. The method as defined in paragraph 1, wherein generating the pixelated model comprises generating a plurality of pixelated models; performing a pixel-to-pixel comparison of the pixelated models and a reference pixelated model; and determining a final pixelated model based on the comparison, the final pixelated model being utilized to determine the formation characteristics.

3. The method as defined in paragraphs 1 or 2, wherein, during the comparison of the pixelated models, a weighted function is applied to weigh pixels according to proximity to a logging tool position.

4. The method as defined in any of paragraphs 1-3, wherein generating the pixelated model comprises generating a plurality of pixelated models; performing a pixel-to-pixel comparison of the pixelated models; and determining a final pixelated model based on the comparison, the final pixelated model being utilized to determine the formation characteristics.

5. The method as defined in any of paragraphs 1-4, wherein, during the comparison of the pixelated models, a weighted function is applied to weigh pixels according to proximity to a logging tool position.

6. The method as defined in any of paragraphs 1-5, wherein the layered earth model comprises layers defined by bed boundaries, each layer representing a resistivity value of the formation; and the pixelated model comprises pixels which correspond to the layers, each pixel representing the resistivity value of a corresponding layer.

7. The method as defined in any of paragraphs 1-6, wherein each pixel has an indicator representing the resistivity value of the pixel.

8. The method as defined in any of paragraphs 1-7, wherein the indicator may be a color or gray scale.

9. The method as defined in any of paragraphs 1-8, further comprising performing a wellbore operation based upon the formation characteristics.

10. A system for modeling a subterranean formation, comprising a logging assembly having one or more sensors positioned thereon to acquire resistivity measurements; and processing circuitry coupled to the sensors and operable to perform a method comprising: acquiring logging data representing formation resistivity along a wellbore; performing a distance-to-bed-boundary ("DTBB") inversion process on the logging data to thereby generate a layered earth model; pixelating the layered earth model to thereby generate a pixelated model; and determining one or more formation characteristics using the pixelated model.

11. The system as defined in paragraph 10, wherein generating the pixelated model comprises: generating a plurality of pixelated models; performing a pixel-to-pixel comparison of the pixelated models and a reference pixelated model; and determining a final pixelated model based on the comparison, the final pixelated model being utilized to determine the formation characteristics.

12. The system as defined in paragraphs 10 or 11, wherein, during the comparison of the pixelated models, a weighted function is applied to weigh pixels according to proximity to a logging tool position.

13. The system as defined in any of paragraphs 10-12, wherein generating the pixelated model comprises generating a plurality of pixelated models; performing a pixel-to-pixel comparison of the pixelated models; and determining a final pixelated model based on the comparison, the final pixelated model being utilized to determine the formation characteristics.

14. The system as defined in any of paragraphs 10-13, wherein, during the comparison of the pixelated models, a weighted function is applied to weigh pixels according to proximity to a logging tool position.

15. The system as defined in any of paragraphs 10-14, wherein the layered earth model comprises layers defined by bed boundaries, each layer representing a resistivity value of the formation; and the pixelated model comprises pixels which correspond to the layers, each pixel representing the resistivity value of a corresponding layer.

16. The system as defined in any of paragraphs 10-15, wherein each pixel has an indicator representing the resistivity value of the pixel.

17. The system as defined in any of paragraphs 10-16, wherein the indicator may be a color or gray scale.

18. The system as defined in any of paragraphs 10-17, further comprising performing a wellbore operation based upon the formation characteristics.

Moreover, the methods described herein may be embodied within a system comprising processing circuitry to implement any of the methods, or a in a non-transitory computer-readable medium comprising instructions which, when executed by at least one processor, causes the processor to perform any of the methods described herein.

Although various embodiments and methods have been shown and described, the disclosure is not limited to such embodiments and methods and will be understood to include all modifications and variations as would be apparent to one skilled in the art. Therefore, it should be understood that the disclosure is not intended to be limited to the particular forms disclosed. Rather, the intention is to cover all modifications, equivalents and alternatives falling within the spirit and scope of the disclosure as defined by the appended claims.

What is claimed is:

1. A method for modeling a subterranean formation, comprising:
   acquiring logging data representing formation resistivity along a wellbore, the logging data being acquired at a same wellbore depth;
   performing a distance-to-bed-boundary ("DTBB") inversion process on the logging data to thereby generate a plurality of layered earth models each corresponding to the same wellbore depth;
   pixelating the plurality of layered earth models to thereby generate a plurality of pixelated models; and
   comparing the plurality of pixelated models to determine one or more formation characteristics.

2. The method as defined in claim 1, wherein generating the plurality of pixelated models comprises:
   performing a pixel-to-pixel comparison of the plurality of pixelated models and a reference pixelated model; and
   determining a final pixelated model based on the comparison, the final pixelated model being a pixelated model that most closely matches the reference pixelated model, and the final pixelated model being utilized to determine the one or more formation characteristics.

3. The method as defined in claim 2, wherein, during the comparison of the plurality of pixelated models and the reference pixelated model, a weighted function is applied to weigh pixels according to proximity to a logging tool position.

4. The method as defined in claim 1, wherein generating the plurality of pixelated models comprises:
   performing a pixel-to-pixel comparison of the plurality of pixelated models; and
   determining a final pixelated model based on the comparison, the final pixelated model being utilized to determine the one or more formation characteristics.

5. The method as defined in claim 4, wherein, during the comparison of the plurality of pixelated models, a weighted function is applied to weigh pixels according to proximity to a logging tool position.

6. The method as defined in claim 1, wherein:
   the plurality of layered earth models comprise layers defined by bed boundaries, each layer representing a resistivity value of the subterranean formation; and
   the plurality of pixelated models comprise pixels which correspond to the layers, each pixel representing the resistivity value of a corresponding layer.

7. The method as defined in claim 6, wherein each pixel has an indicator representing the resistivity value of the pixel.

8. The method as defined in claim 7, wherein the indicator may be a color or gray scale.

9. The method as defined in claim 1, further comprising performing a wellbore operation based upon the one or more formation characteristics.

10. A non-transitory computer-readable medium comprising instructions which, when executed by at least one processor, causes the at least one processor to perform the method of claim 1.

11. A system for modeling a subterranean formation, comprising:
    a logging assembly having one or more sensors positioned thereon to acquire resistivity measurements; and
    processing circuitry coupled to the one or more sensors and operable to perform a method comprising:
       acquiring logging data representing formation resistivity along a wellbore, the logging data being acquired at a same wellbore depth;
       performing a distance-to-bed-boundary ("DTBB") inversion process on the logging data to thereby generate a plurality of layered earth models each corresponding to the same wellbore depth;
       pixelating the plurality of layered earth models to thereby generate a plurality of pixelated models; and
       comparing the plurality of pixelated models to determine one or more formation characteristics.

12. The system as defined in claim 11, wherein generating the plurality of pixelated models comprises:
    performing a pixel-to-pixel comparison of the plurality of pixelated models and a reference pixelated model; and
    determining a final pixelated model based on the comparison, the final pixelated model being a pixelated model that most closely matches the reference pixelated model, and the final pixelated model being utilized to determine the one or more formation characteristics.

13. The system as defined in claim 12, wherein, during the comparison of the plurality of pixelated models and the reference pixelated model, a weighted function is applied to weigh pixels according to proximity to a logging tool position.

14. The system as defined in claim 11, wherein generating the plurality of pixelated models comprises:
   performing a pixel-to-pixel comparison of the plurality of pixelated models; and
   determining a final pixelated model based on the comparison, the final pixelated model being utilized to determine the one or more formation characteristics.

15. The system as defined in claim 14, wherein, during the comparison of the plurality of pixelated models, a weighted function is applied to weigh pixels according to proximity to a logging tool position.

16. The system as defined in claim 11, wherein:
   the plurality of layered earth models comprise layers defined by bed boundaries, each layer representing a resistivity value of the subterranean formation; and
   the plurality of pixelated models comprise pixels which correspond to the layers, each pixel representing the resistivity value of a corresponding layer.

17. The system as defined in claim 16, wherein each pixel has an indicator representing the resistivity value of the pixel.

18. The system as defined in claim 17, wherein the indicator may be a color or gray scale.

19. The system as defined in claim 11, further comprising performing a wellbore operation based upon the one or more formation characteristics.

* * * * *